(No Model.) 4 Sheets—Sheet 2.

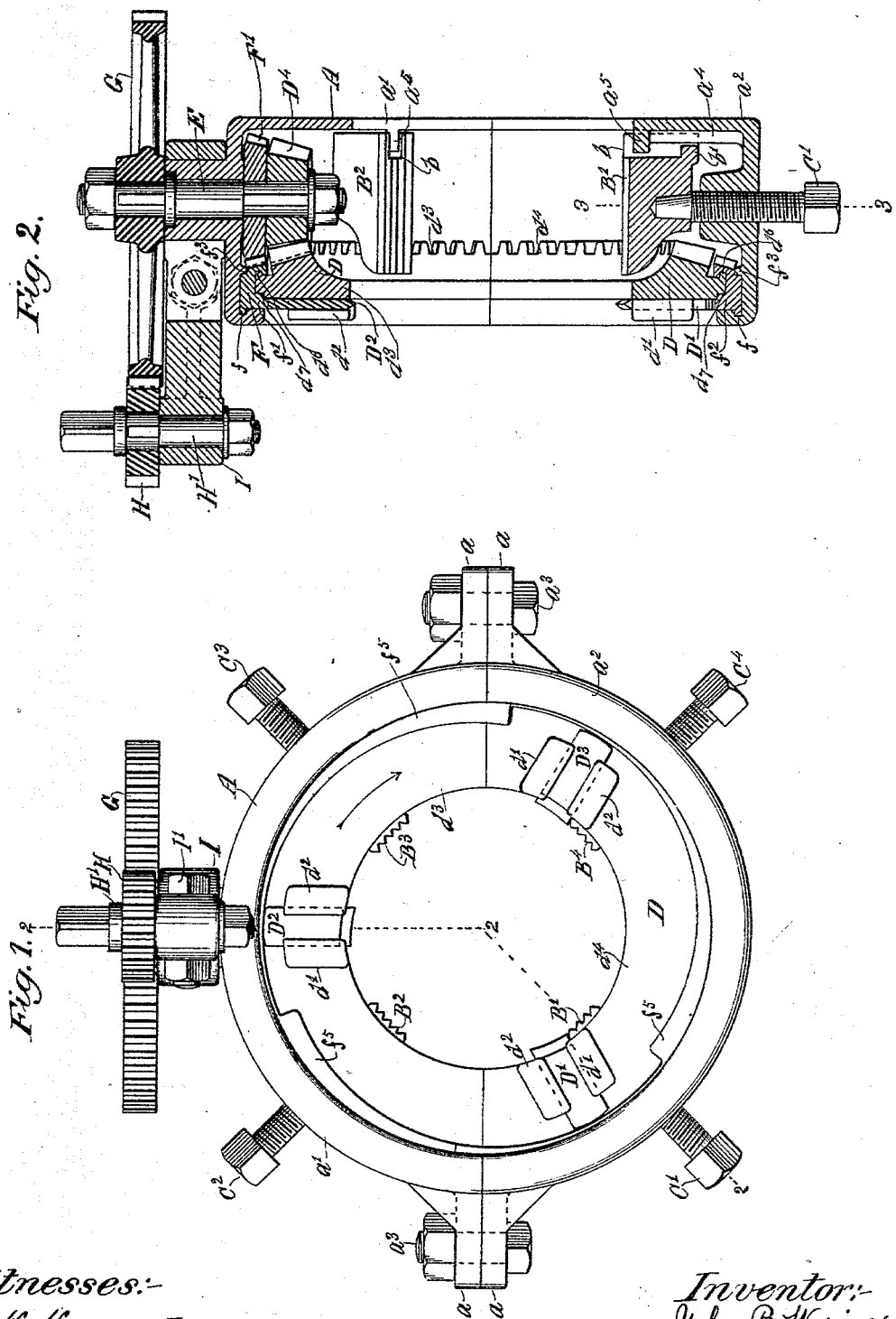

J. B. WARING.
MACHINE FOR CUTTING PIPES.

No. 514,577. Patented Feb. 13, 1894.

Witnesses:—
D. H. Haywood
William M. Iliff

Inventor:
John B. Waring
By his attorney
Edwin H. Brown (No Model.) 4 Sheets—Sheet 3.

J. B. WARING.
MACHINE FOR CUTTING PIPES.

No. 514,577. Patented Feb. 13, 1894.

Witnesses:-
D. N. Hayford
William M. Iliff

Inventor:-
John B. Waring.
By his attorney
Edwin H. Brown (No Model.) 4 Sheets—Sheet 4.
J. B. WARING.
MACHINE FOR CUTTING PIPES.
No. 514,577. Patented Feb. 13, 1894.
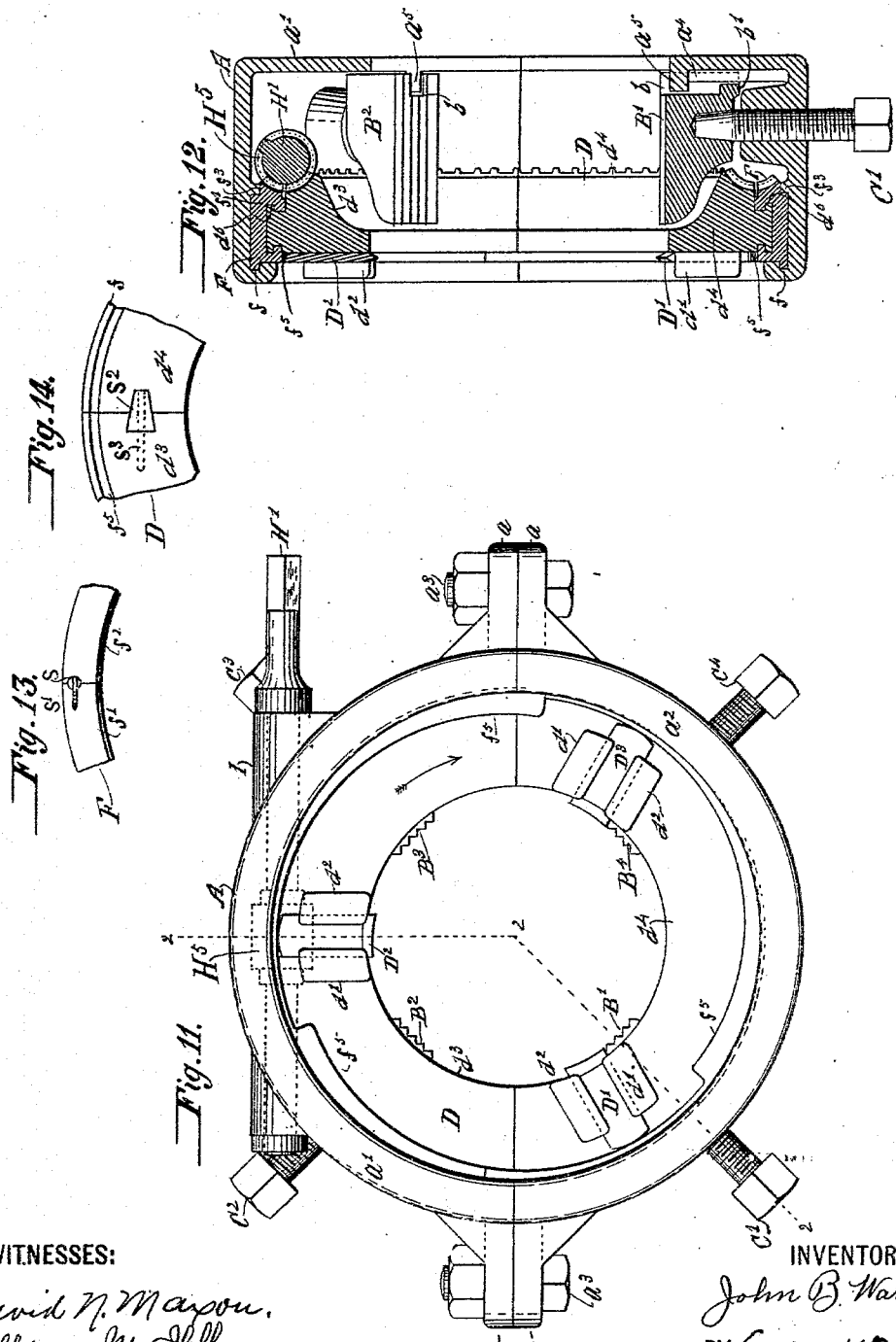
WITNESSES:
David N. Mason.
William McIlff.
INVENTOR
John B. Waring
BY Edwin H. Brown
his ATTORNEY
THE NATIONAL LITHOGRAPHING COMPANY,
WASHINGTON, D. C.

UNITED STATES PATENT OFFICE.

JOHN B. WARING, OF NEW YORK, N. Y.

MACHINE FOR CUTTING PIPES.

SPECIFICATION forming part of Letters Patent No. 514,577, dated February 13, 1894.

Application filed March 17, 1893. Serial No. 466,419. (No model.)

*To all whom it may concern:*

Be it known that I, JOHN B. WARING, of the city, county, and State of New York, have invented a certain new and useful Improvement in Machines for Cutting Pipes, of which the following is a specification.

My improvement relates to machines intended for cutting pipe transversely to its length.

The object of the improvement is to produce a more efficient machine of this class, which will be adapted for the cutting of cast iron, as well as other pipe, even while the pipe is in position for use, and withal, shall be of very simple construction.

I will describe a machine embodying my improvement, and then point out the novel features in the claims.

Figure 4:
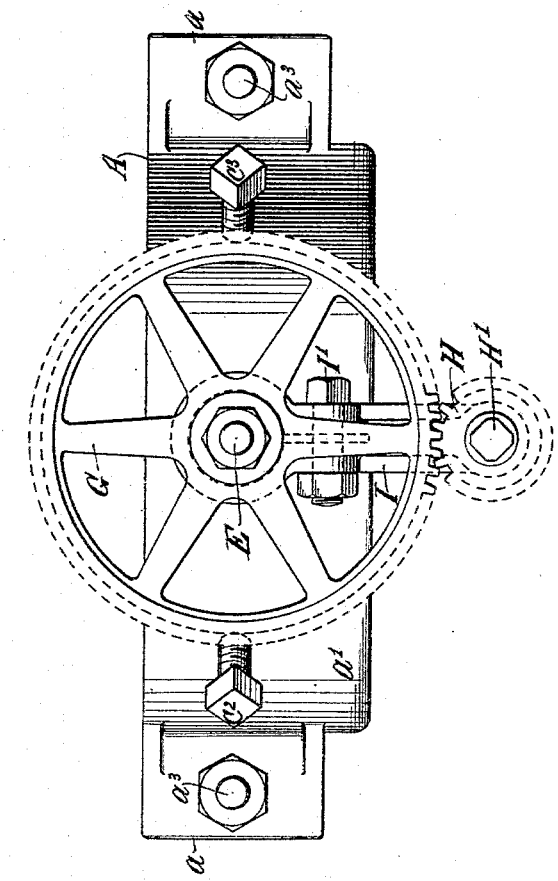
Figure 5:
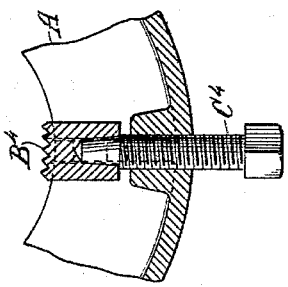
Figure 10:
Figure 8:
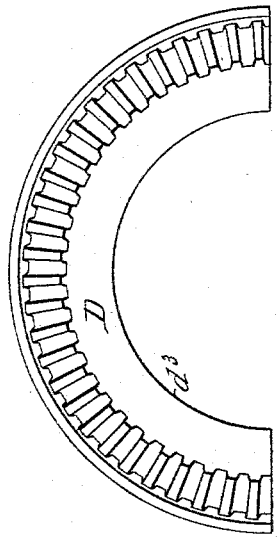
Figure 9:
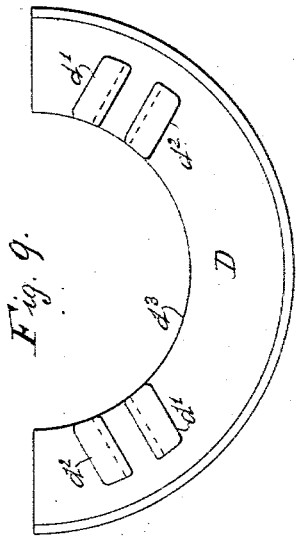
Figure 7:
Figure 5:
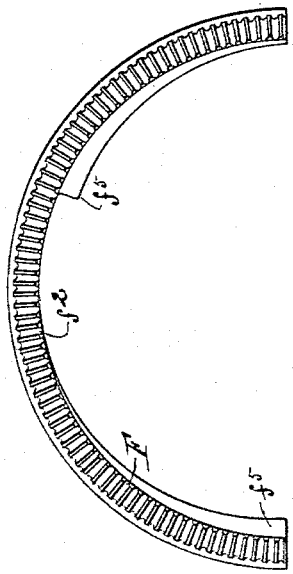
Figure 6:
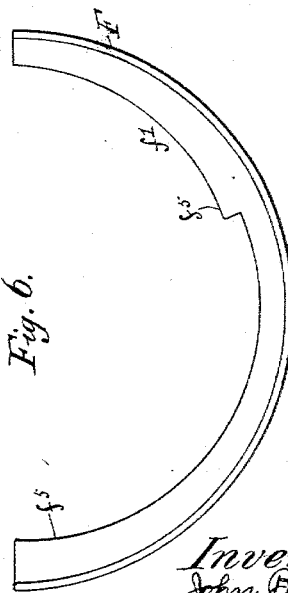

In the accompanying drawings, Figure 1 is an end view of a machine embodying my improvement. Fig. 2 is a transverse section of the same, taken as indicated on the dotted line, 2, 2, Fig. 1. Fig. 3 is a vertical section taken as indicated by the line 3, 3, Fig. 2. Fig. 4 is a top view of the machine. Fig. 5 is a rear view of a gear section used in the machine. Fig. 6 is a front view of said gear section. Fig. 7 is a side view of a pinion for engaging with the gear section, and shown in Figs. 5 and 6, and a complementary section, of the latter. Fig. 8 is a rear view of another gear section. Fig. 9 is a front view of this gear section. Fig. 10 is a side view of a pinion for engaging with the gear section, illustrated in Figs. 8 and 9 and the complementary section, in the latter. Fig. 11 is a view similar to Fig. 1, illustrating a modification. Fig. 12 is a view similar to Fig. 2, and illustrating the same construction as Fig. 11. Figs. 13 and 14 are back views of portions of two gear wheels.

Similar letters of reference designate corresponding parts in all the figures.

A designates the main frame of the machine. It may be made of any suitable material, as, for instance, cast iron. It will probably be made in the form of a hollow cylinder or ring. In any event, its inner surface will be most advantageously made separate. It is composed of two sections $a'$ $a^2$, which, as here shown, are semi-cylindric and are abutted end to end. At or near their abutting inner ends are laterally extending lugs $a$, and through them pass screw bolts $a^3$, whereby the two sections are fastened together. The advantage of this construction arises from the facility afforded for applying the frame A to a pipe without being obliged to slip it over the end of the pipe.

Within the frame A are clamps $B^1$ $B^2$ $B^3$ $B^4$ for fastening the frame A upon a pipe. These clamps consist of blocks fitted to the frame A so as to be adjustable radially. On their inner ends they are provided with teeth, the better to enable them to grip a pipe. As here shown, they are provided on their front sides with radial grooves $b$ which are fitted to radial ribs $a^4$ formed on the frame A. At the bottom of each groove $b$ is a lug $b'$, and at the top of each rib $a^4$ is a lug $a^5$, which extends over the plane of a lug $b'$. By the use of these lugs $b'$ $a^5$, these blocks are limited in their inward movement.

$C'$ $C^2$ $C^3$ $C^4$ are radially arranged screws engaging with tapped holes in the frame A and having their inner extremities fitted to bearings formed in the outer portions of the clamps B. By manipulating these screws, the clamps may be adjusted and caused to forcibly impinge against a pipe.

$D'$ $D^2$ $D^3$ are radially arranged cutters fitted in slide-ways formed by pairs of lugs $d'$ $d^2$ extending from the front face of a gear wheel D. This gear wheel is composed of two sections $d^3$ $d^4$, each of which is semi-cylindric; the two having their ends abutted together. The advantage of making this gear wheel in two sections is to enable it to be fitted around the pipe sidewise as distinguished from being slipped over the end of a pipe. Motion is imparted to the gear wheel D which carries the cutters $D'$ $D^2$ $D^3$ by means of a pinion $D^4$ mounted upon a stud or shaft E fitted in a bearing formed in a radially extending boss which is integral with the frame A. The pinion $D^4$ is keyed to the stud or shaft so as rotate with the latter.

F designates another gear wheel which is composed of two sections $f'$ $f^2$. It is made of two semi-cylindrical sections abutted together end to end for the purpose of facilitating its application to a pipe. Each section of the gear wheel F is provided with a laterally extending rim or flange $f$ on its front side and this enters and engages with a groove formed in the frame A, it being held in said groove by a tongue $f^3$ extending from the frame A adjacent to a shoulder formed on the gear section. Each section of the gear wheel D is provided with a rim or flange $d^6$ which engages with a groove formed in a corresponding section of the gear wheel F, and the latter has a shoulder $d^7$ that holds the rim or flange $d^6$ of each gear wheel section D in engagement with the said groove in the corresponding gear wheel section F.

F' is a pinion keyed to the stud or shaft E and engaging with the gear wheel F.

It will be observed that the teeth of the gear wheel sections are on their forward sides so as to engage with the pinions $D^4$ and F. As the gear wheels are made in semi-cylindrical sections and the frame A is similarly made, the gear wheel sections can be inserted end wise in the sections of the frame and rotated or moved longitudinally into place. The gear wheel F is provided near its periphery with a flange composed of eccentric segments $f^5$. The relation of the gear wheels F and D and their pinions F' and $D^4$, are such that the wheel F rotates more slowly than the wheel D. The difference in speed, is, however, very slight and solely for the purpose of causing the eccentric segments $f^5$ of the gear wheel F to operate upon the end of the cutters D' $D^2$ $D^3$, so as to force the latter inward and cause them to cut into and through a pipe.

On the shaft E is affixed a large gear wheel G that engages with a pinion H mounted on a shaft H' that is supported in an arm I. The arm I has at one end a collar which is fitted to the lug in which the bearing for the stud or shaft E is formed. Consequently, this arm is free to revolve. It can be clamped in any desired position by tightening the screw-bolt I', the arm being made with a bifurcate portion to permit of its being clamped or loosened. One end of the shaft H' is shown as being squared for the purpose of receiving a crank.

It will be seen that I have produced a very simple machine which can be applied sidewise around a pipe, and therefore used upon a pipe already in position.

In Figs. 11 and 12, I have illustrated a modification, which consists in the use of a worm $H^5$ instead of pinions F' $D^4$. In this example of my improvement, the teeth of the gear wheels D and F will be slightly modified, to enable them to engage with the thread of the worm.

In Figs. 13 and 14, I have illustrated means for securing the proper alignment of the two sections, of which each of the gear wheels D F, is composed. Looking first at Fig. 13, $s$ designates a cylindrical pin, inserted in a correspondingly shaped recess, extended through the abutting ends of the two semi-circular sections of the wheel F. The pin $s$ extends parallel with the axis of this gear wheel. A convenient way to form a wheel F of two sections and to combine a pin $s$ therewith, is to first form the wheel entire, and before it is divided into semi-circular sections, to bore in a direction, parallel with the axis of the wheel, the recess, which is required for accommodating the pin $s$. Then the pin $s$ may be inserted. Afterward the wheel may be cut in two, on opposite sides of the pin. Finally, the pin may be secured in place by having a pin $s'$ passed, transversely, through it and into the end of one of the semi-circular sections of the wheel. If the abutting ends of the two sections of the gear wheel are illustrated, there will be locks or keys, consisting of two such pins, as the pin $s$, for holding the two semi-circular sections in alignment.

In Fig. 14 I have shown a pin or key $s^2$, shaped like the keystone of an arch. This may be applied in the same manner as the pin $s$, and similarly secured in place after the cutting of the gear wheel into the two semi-circular sections, by introducing a pin $s^3$.

What I claim as my invention, and desire to secure by Letters Patent, is—

1. In a machine for cutting pipes, the combination of an internally, cylindrical frame of separable sections, cutters, a wheel for operating the cutters, and also made of separable sections, a similarly made wheel for carrying cutters, and means whereby one of the wheels will be driven faster than the other, substantially as specified.

2. In a machine for cutting pipes, the combination of an internally, cylindrical frame, cutters, a wheel for operating cutters, a wheel for carrying cutters, and means whereby one of the wheels will be driven faster than the other, substantially as specified.

3. In a machine for cutting pipes, the combination of an internally, cylindrical frame, cutters, a wheel carrying cutters, a cutter operating, or pinion wheel, provided with eccentric segments $f^5$ and means for operating said wheels, so that one will rotate faster than the other, substantially as specified.

In testimony whereof I have signed my name to this specification in the presence of two subscribing witnesses.

JOHN B. WARING.

Witnesses:
ANTHONY GREF,
WILLIAM M. ILIFF.